Dec. 23, 1958 C. S. REIS 2,866,013

MAGNETIC RECORD METHOD AND APPARATUS

Filed May 24, 1955 2 Sheets-Sheet 1

INVENTOR.
Charles S. Reis

BY Flehr & Swain

ATTORNEYS

Dec. 23, 1958 C. S. REIS 2,866,013

MAGNETIC RECORD METHOD AND APPARATUS

Filed May 24, 1955 2 Sheets-Sheet 2

INVENTOR.
Charles S. Reis
BY
Flehr & Swain
ATTORNEYS

United States Patent Office 2,866,013

Patented Dec. 23, 1958

2,866,013

MAGNETIC RECORD METHOD AND APPARATUS

Charles S. Reis, San Bruno, Calif.

Application May 24, 1955, Serial No. 510,645

14 Claims. (Cl. 179—100.2)

This invention relates generally to methods and apparatus of the type in which an electrical signal is recorded on a magnetic medium, and the record track subsequently translated or reproduced.

Conventional methods and apparatus of the above character generally employ a so-called magnetic tape, which consists of a strip of pliable plastic material having a thin magnetic coating applied to one side of the same. In some instances the medium may be in the form of a disk, cylinder or belt, instead of a tape. Also instead of a coated material, the medium may be a wire, tape, disk, belt or cylinder made of magnetic metal. Assuming the use of magnetic tape of the plastic type, the tape is moved past a magnetic recording head at a constant rate, with the magnetic gap between the pole tips of the head extending at right angles to the direction of tape movement. Current variations applied to the winding of the head cause corresponding variations in the magnetic flux applied by the pole tips to the tape, thus forming a magnetic record track which can be reproduced. The reproducing head employed is likewise of the magnetic type, having spaced magnetic pole tips positioned in contact with the tape in the same manner as the recording head.

It is recognized that conventional magnetic record equipment of the type described above is subject to certain disadvantages. The usable frequency spectrum of such apparatus is limited, and for the standard tape speeds it is generally considered impractical to attempt reproduction of frequencies of the order of 500 kc. or higher. While it is possible to reproduce relatively high frequencies by increasing the speed of movement of the tape, the tape speeds required for frequencies of the order of 1 to 3 megacycles or higher become absurd and impractical. In general it can be stated that the frequency limitation of the present day conventional equipment is governed primarily by two factors, namely tape speed and width of the magnetic gap in the reproducing head.

In general it is an object of the present invention to provide apparatus of the above character which will avoid use of the conventional magnetic head for reproduction of a magnetic record.

Another object of the invention is to provide apparatus of the above character which will afford a relatively flat frequency response curve over a wide range of operating frequencies.

Another object of the invention is to provide apparatus of the above character which will permit reproduction of frequencies without distortion of the reproduced signal wave shape form.

Another object of the invention is to provide a reproducing device for use in apparatus of the above character, which will not make use of the principle of magnetic induction, as with present transducers, but which will take advantage of the so-called Hall effect, which is exhibited by certain elements like germanium. As will be presently explained, my reproducing device obtains voltage differences which are directly proportional to the strength of the magnetic field, and the construction is such that this is made possible over the frequency spectrum which one desires to reproduce.

Additional objects and features of the invention will appear from the following description in which the preferred embodiments have been set forth in detail in conjunction with the accompanying drawings.

Referring to the drawings.

Figures 9A and B have end and side views respectively showing the construction of the recording unit.

Figure 10:
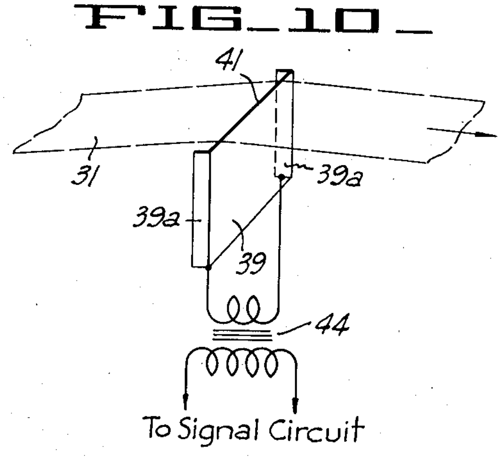

Figure 10 is a schematic view showing how the recording head cooperates with a magnetic tape.

Figure 11:
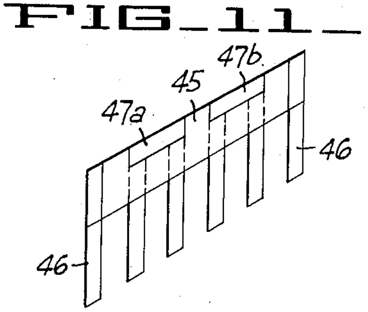

Figure 11 is a schematic perspective view like Figure 10 but showing another embodiment.

Figure 12:
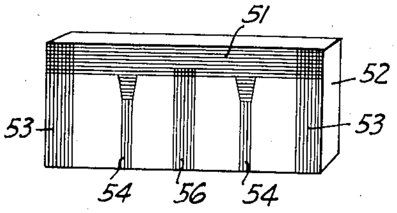

Figure 12 is a perspective view showing another embodiment of the invention.

Figure 13:
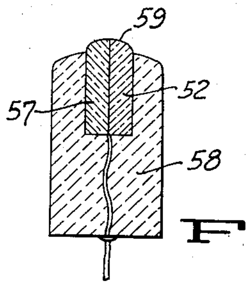

Figure 13 is a cross-sectional detail showing a complete assembly having a thin film made as shown in Figure 12.

Figure 14:
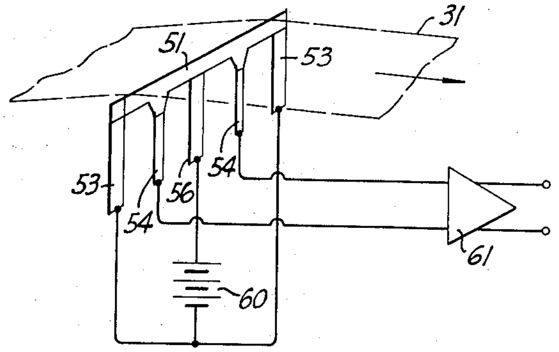

Figure 14 is a perspective view showing how connections are made for the modification of Figures 12 and 13.

The Hall effect, mentioned above, can be explained as follows: Assuming that the element employed is crystal germanium in the form of a cube, with the opposed faces intersected by the perpendicular axes $x$, $y$, and $z$, a potential gradient will appear across the cube in the direction of the $z$ axis, when current is caused to flow through the cube in the direction of the $x$ axis, and a magnetic field is applied in the direction of the $y$ axis. The potential gradient is directly proportional to the current intensity and the applied magnetic field. The constant of the proportionality is termed the Hall constant. Other elements, including particularly silicon and galena, likewise exhibit the Hall effect, and have constants far above any of the passive metals.

In accordance with my invention I employ a thin film of germanium or like material exhibiting the Hall effect. This film is mounted in such a manner that one edge of it is presented to the magnetic record. Terminals are connected to the film for applying an exciting current, and additional terminals are applied to opposite surfaces of the film and upon which voltage differences are developed. The latter terminals are connected to means including an electronic amplifier for reproducing or translating the developed voltage differences. Known types of magnetic recording heads can be used for making the magnetic record. However I have disclosed herein a conductive film gap type of recording head which I have successfully used for the higher frequencies, as for example frequencies of the order of from 1 to 3 mc.

Figure 1:
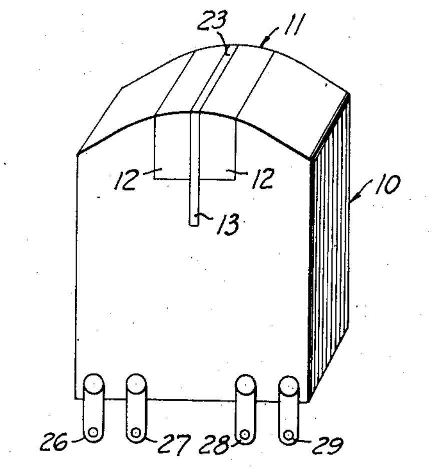
Figure 1 is a perspective view illustrating a reproducing head incorporated in the present invention.

The reproducing device illustrated in Figure 1 consists of a body 10 which can be formed of suitable molded plastic material, and which carries the reproducing or transducer unit 11. The unit 11 consists of the members 12, which are disposed upon opposite sides of a thin wafer or plate 13 of dielectric material, such as quartz or glass. The plate 13 serves as a mounting for the thin film of germanium or other material exhibiting the Hall effect.

Figure 4:
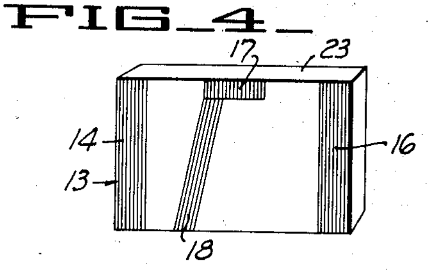
Figures 4, 5 and 6 are perspective views illustrating various stages in manufacture.
Figure 5:
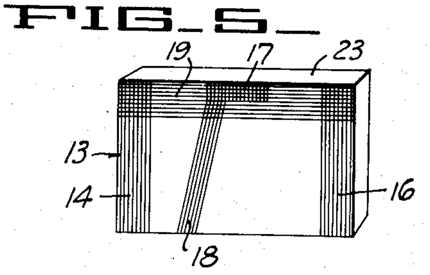
Figure 6:
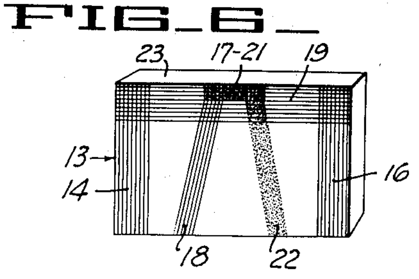

One manner in which the film of germanium is applied to the plate 13, together with terminals for the same, can best be understood by reference to Figures 4, 5 and 6. Thin metal terminal films 14 and 16 are applied to end margins of the glass plate on one side thereof, by known metal vaporization methods. The metal may be silver, which has relatively good conductivity and is not subject to excessive oxidation. In addition to the terminal films 14 and 16, the thin metal films 17 and 18 are likewise applied. Film 17 is applied intermediate the terminals 14 and 16, and in close proximity with one edge of the plate. The film 18 forms in effect a terminal lead making connection with the terminal 17, and extending to the opposite edge of the plate. The thickness of the metal films applied to the plate may vary, but in a typical instance they may range from 2 to 5 microns.

The next step illustrated in Figure 5 is to apply the thin film 19 of germanium, or other material which is used and which exhibits the Hall effect. The ends of this film overlap and make direct contact with the metal terminals 14 and 16, and one side of the film is in direct electrical contact with the Hall terminal 17.

A second Hall terminal 21, with its terminal lead 22, is applied to the germanium film directly over the region of the first terminal 17. Likewise it extends to the adjacent edge of the plate 13, which is the edge which contacts the magnetic tape for reproduction. The films thus applied can be covered with a thin insulating film, such as vaporized quartz or magnesium fluoride.

Figure 2:
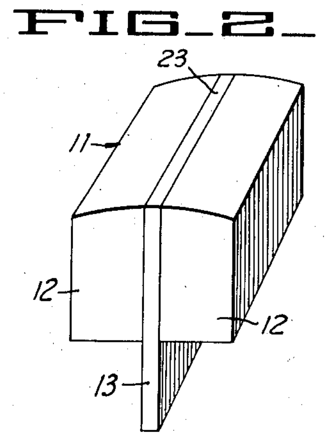
Figure 2 is a perspective view showing the reproducing unit incorporated in the head of Figure 1.
Figure 3:
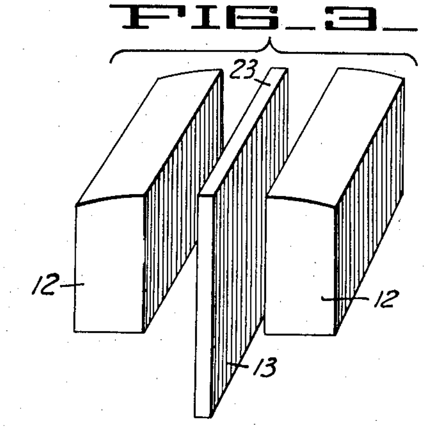
Figure 3 is an exploded view showing various parts of the reproducing unit.

After applying the germanium film and its associated terminals, it is desirable to mount the assembly as by placing it between the members 12, in the manner shown in Figures 2 and 3. If desired, suitable cement can be used whereby the members 12 are permanently attached to the plate. However, the entire assembly can be mounted within the body 10 in such a manner as to be held under compression.

The members 12 can be made of a material having high magnetic permeability, such as Ferrite. Ferrite is a material of high permeability made by the compression of ferrous metal powder. The shielding effect of magnetic members 12 can be omitted by forming them of non-magnetic material.

The last step of the manufacturing method is to lap the end face of the unit 11, so that the edge face 23 is optically true, and whereby the exposed edge of the germanium film is true with respect to the adjacent surfaces of the glass plate and magnetic shielding members.

In the assembly of Figure 1 the terminals 14 and 16 are electrically connected to terminal tabs 26 and 27, and terminal leads 18 and 22 are connected to the tabs 28 and 29.

Operation of the reproducing head described above is illustrated in Figure 7. In this schematic view the germanium film 19 has been shown by itself, with its one edge contacting the face of a magnetic tape. It is assumed that the magnetic tape has a magnetic record track on its coated magnetic surface, and that the tape is moved across the reproducing device at a constant rate. The terminal strips 14 and 16 are connected to a source 32 of exciting current, which can be an oscillator or a suitable source of alternating current. The terminals 18 and 22 are shown connected to a reproducing system, which in this instance includes the electronic amplifier 33. The frequency of the source of exciting current is preferably well above the frequency spectrum being reproduced. Thus where the recorded frequency extends up to say 3 mc., the exciting current can have a frequency of the order of 10 mc. It is desirable for the system connected to the terminals 18 and 22 to include means 34 to detect and suppress undesired frequency components of the exciting current, whereby such frequency components do not appear in the output of the amplifier 33.

Figure 7:
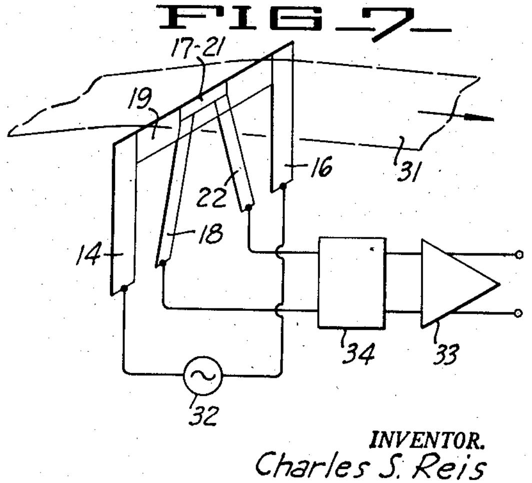
Figure 7 is a schematic view illustrating how the reproducing head operates in conjunction with a magnetic tape and showing a complete reproducing system.

As illustrated in Figure 7 the germanium film extends substantially perpendicular to the magnetic tape, and at right angles to the length of the tape. As the tape with its magnetic record passes across the edge of the germanium film, the extremely small increments of the record which at any instant are adjacent the germanium film cause magnetic flux from the same to pass through the film in the direction of its plane. The arrangement is such that the portion of the film through which the flux passes is directly between the terminals 17 and 21. Since this portion of the film also carries exciting current, a voltage difference is developed between the terminals 17 and 21. With continuous movement of the tape it will be apparent that the voltage differences depend upon the magnetization of the record, and are amplified by the amplifier 33 for utilization in any desired manner, as for example the reproduction of video images, and the like.

The film of germanium should have a crystalline form suitable to exhibit the Hall effect. One way to form the film is to reduce a thicker wafer of crystalline germanium by known techniques of grinding and etching, to a film of the desired thickness. Also one may employ vaporization techniques, provided suitable control factors are employed to provide a film exhibiting the Hall effect.

It will be evident from the foregoing that my reproducing head is not subject to the same limitations as conventional magnetic heads. The zone through which magnetic flux from the record is effective can be relatively thin, and may be less than the width of the zone through which flux of the track is effective on a conventional magnetic head. In contrast with the limited frequency range of conventional magnetic heads, my invention can be constructed to reproduce relatively high signal frequencies. Normal tape speeds can be used for relatively high frequencies, or if desired greatly reduced tape speeds can be used for the reproduction of lower frequencies, such as frequencies within the audio range. The frequency response curve is relatively flat over a wide frequency spectrum, which is due to the fact that the voltage response obtained is not dependent upon the principle of induction. The device is capable of reproducing the wave form of the recorded signal with relatively high fidelity, or in other words with a minimum amount of wave distortion.

While my invention is applicable for reproducing high frequencies, it likewise is applicable to the lower frequencies, such as the audio range. When the head is constructed for the lower frequencies, the material exhibiting the Hall effect can be considerably thicker, as for example from 0.0005 to 0.002 inch.

Assuming that the members 12 are made of non-magnetic material, or are omitted, the magnetic flux from the tape passes laterally through the germanium film, instead of being confined to pass through the film in the direction of its plane.

Figure 8:
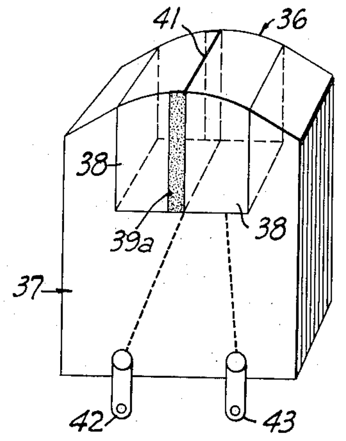
Figure 8 is a perspective view showing a novel form of recording head.
Figure 9:
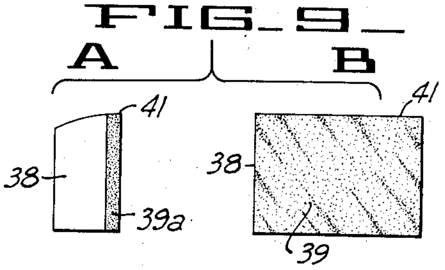

Figures 8 to 10 inclusive illustrates a type of recording head which I have used for magnetic recording over a wide frequency spectrum. This head makes use of a relatively thin film of conductive metal which has its one end in close proximity with the magnetic tape, and through which current is passed having variations dependent upon the signal being recorded. As shown in Figure 8 the recording unit 36 is provided with a suitable mounting 37, and is arranged to be contacted with the coated side of a magnetic tape, or to be otherwise placed in operative relationship to a medium upon which the magnetic record is to be made. The unit 36 consists of two magnetic shielding members 38 which are made of material of high magnetic permeability, such as Ferrite. The opposed faces of these blocks are flat. A thin film 39 of metal having good electrical conductivity such as silver, is applied to one flat face of one of the shielding members, in the manner shown in Figures 9A and 9B. Such a film can be applied by known metal vaporization methods, and may have a thickness of the order of 2 microns. Preferably the film is provided with extensions 39*a* which are upon the end faces of the member, to facilitate making electrical connections. The two blocks are then assembled together, and the film edge 41 and the adjacent surfaces of the shielding members subjected to lapping whereby the surfaces are relatively true for contact with the coated surface of the tape. In the assembly of Figure 8 the shielding members are clamped together under compression. If desired suitable cement can be applied before the parts are assembled. For convenience the extensions 39*a* are shown connected to the terminal tabs 42 and 43.

Where shielding blocks made of magnetic material other than Ferrite are used, their faces can be provided with a thin insulating film, such as vaporized quartz.

Asuming that the magnetic tape is drawn across the tip end of the unit 36, the metal film 39 is disposed substantially perpendicular to the tape, and at right angles to the length of the tape. The signal circuit being used for recording includes a power amplifier having an output impedance matching transformer 44. The secondary of this transformer directly connects with the film 39.

In the operation of the recording head just described it will be evident that the metal film 39 becomes a conductor of the signal current, and that an intensely localized magnetic field extends from the edge 41 of the film, and magnetizes the tape to produce the desired magnetic record track. Because of the localized character of the magnetic flux extending from the edge of the conductor film, it will be evident that the arrangement can be used to record relatively high frequencies, without resorting to high speeds for movement of the tape.

As previously pointed out the invention can be used in conjunction with various types of magnetic mediums, in addition to the common magnetic tape. It will be apparent that the shaping of the unit 11, particularly with respect to the end surfaces which contact the magnetic medium, may be modified in accordance with the medium itself. For example where the medium is a wire of magnetic material, it may be desirable to provide the end surfaces of the members 12 with a groove or slot for receiving the wire, whereby the germanium film presents an arcuate edge to the wire.

In general the effective width of the Hall terminals, in the direction of the edge of the germanium film which is presented to the magnetic medium, may correspond to the width of the magnetic track. This may correspond generally to conventional practice. Where several parallel record tracks are upon the same medium, a multi-channel unit can be made as illustrated schematically in Figure 11. In this instance the germanium film 45 is provided with the end terminals 46 for applying exciting current, and with two sets of Hall terminals 47*a* and 47*b*. These terminals are spaced with respect to each other and with respect to the terminals 46. With an arrangement of this type it is evident that two channels can be reproduced simultaneously, without interference between the reproduced frequencies, and with a single germanium film and exciting current source for both channels.

By way of example, in one particular instance a reproducing unit was constructed in the manner described with reference to Figures 4 to 6 inclusive, and with dimensions as follows: The plate 13 was made of glass, having a thickness of 0.001 inch, a length (as measured crosswise of the magnetic tape) and width of 0.25 inch. The metal terminals 14 and 16 were deposited by metal vaporization, with a thickness of about 2 microns. This was likewise true of the terminal films 17 and 18. The germanium film 19 was applied with a thickness of about 2 microns, with a width (as measured perpendicular to the magnetic tape) of 0.003 inch. The terminal films 21 and 22 had the same dimensions as the films 17 and 18.

The unit described in the foregoing example was mounted on a conventional magnetic tape recording machine with the end face 23 in contact with the magnetic tape, in place of a conventional magnetic reproducing head. The plane of the plate 13 was perpendicular to the tape, and at right angles to the length of the tape. Frequencies ranging up to 3 megacycles were recorded upon the tape, making use of the special recording head previously described with reference to Figures 8 to 10, inclusive. The generator 32 supplied about 0.25 miliwatt through the terminals 14 and 16, at a frequency of 10 mc. For a recorded frequency of 3 megacycles a reproduced signal frequency was obtained with a reasonable noise to signal ratio, thus demonstrating that the invention is usable over a frequency spectrum ranging up to 3 megacycles or higher.

Another embodiment of the invention is shown in Figures 12 to 14, inclusive. In this instance a thin film or wafer 51 of germanium (or other material exhibiting the Hall effect) is provided on the insulating plate 52. End connecting terminals 53 are provided, and in addition intermediate terminals 54 and 56 are provided. Assuming that the film 51 is in the form of a strip as illustrated in Figure 12, terminals 54 and 56 connect with that edge of the film remote from the edge which contacts the magnetic tape. Terminal 56 connects at a point midway between the terminals 53. Terminals 54 connect at points midway between terminals 53 and 56. After forming the film and terminals as shown in Figure 12, a second plate 57 of insulating material can be positioned adjacent the film 51, and the two plates then mounted in a suitable body 58, such as a body made of plastic material. Lead wires extend from the several terminals to exposed terminal tabs as illustrated. The exposed edges of the insulating plates are suitably finished, as by grinding, to provide a surface 59 for contacting the tape.

Figure 14 illustrates the manner in which the embodiment described above is connected to biasing means and to an output amplifier. A suitable source of current, such as a battery 60, has its one side connected to the terminal 56, and its other side connected to the end terminals 53. Terminals 54 connect to the input side of the amplifier 61.

Operation of the embodiment illustrated in Figures 12–14 is as follows: The various portions of the film 51 form, in effect, the branches of a bridge. The two points that connect to the input of the amplifier 61 are balanced with respect to the biasing battery. The application of magnetic flux to the film from the magnetic tape causes (by virtue of the Hall effect) voltage differences between terminals 54 and these voltage differences are applied to the input of the amplifier 61 to provide the desired signal output. Assuming that no magnetic shielding is employed, then this device is responsive to the longitudinal component of the magnetic field, having reference to the component extending lengthwise of the magnetic tape.

This application is a continuation-in-part of my copending application Serial No. 425,476, filed April 26, 1954.

I claim:

1. In a method for the reproduction of a magnetic track recorded on a magnetic medium wherein a member made of a material exhibiting the Hall effect is employed, the steps of moving the medium and the track relative to a confined zone occupied by said member, the zone extending from the track substantially at right angles thereto whereby flux from the track is applied directly to said material and successive increments of the track determine the magnetic flux in said zone, and utilizing the Hall effect to directly convert variations in said flux into voltage differences.

2. In a method for the reproduction of a magnetic track recorded on a magnetic medium wherein a member made of a material exhibiting the Hall effect is employed, the steps of moving the medium and the track relative to a confined zone, the zone being occupied by said member and extending from said track generally at substantially right angles thereto, whereby same successive increments of the track determine the magnetic flux in said zone, continuously applying an alternating current to said member to excite the same and to cause it to exhibit the Hall effect, and collecting voltage differences developed on said member by virtue of the Hall effect, said collected voltages being in accordance with the magnetic record.

3. In apparatus of the type in which a magnetic medium having a recorded magnetic track thereon is moved relative to a reproducing device for translating the record, reproducing means comprising a relatively thin member formed of material exhibiting the Hall effect, said member having one edge of the same adapted to be placed in close proximity with the record track to thereby directly subject said member to flux from said track, means for applying an exciting current to said member, and means for collecting voltages developed between two portions of said member by virtue of magnetic flux applied to the member from the recorded track, said voltages being in accordance with magnetic variations in the record track.

4. In apparatus of the type in which a magnetic medium having a magnetic track recorded thereon is moved relative to a reproducing device for translating the record, reproducing means comprising a relatively thin member formed of material exhibiting the Hall effect and having one edge of the same disposed in close proximity with the track whereby the magnetic flux of the track passes directly through said member, means for applying an alternating current exciting voltage to said member, and means for collecting voltage differences on two opposite sides of said member by virtue of the Hall effect, said voltages varying in accordance with the variations of the magnetic track.

5. In apparatus of the type in which a magnetic medium having a magnetic record track thereon is moved relative to a reproducing device for translating the record, reproducing means comprising a relatively thin film of material exhibiting the Hall effect, one edge of the film being adapted to be disposed in close proximity with the record track whereby magnetic flux from the track passes directly through said film from said track, means for applying an exciting voltage to said film, and means for collecting voltage differences developed on the two opposite sides of said film, said voltage differences varying in accordance with variations of the magnetic record track.

6. In apparatus of the type in which magnetic medium having a magnetic record thereon is moved relative to a reproducing device for translating the record, reproducing means comprising a thin film of material exhibiting the Hall effect and having one edge of the same in close proximity with the record track whereby flux from the track passes directly through said film from said track, means for exciting the film with a current having a frequency substantially higher than the recorded frequency being reproduced, and means for collecting voltage differences developed on two opposite sides of the film, the voltage differences being in accordance with variations of said track.

7. Apparatus as in claim 6 together with amplifying means having its input connected to said last named means, and means for suppressing frequency components of the exciting frequency whereby such components do not appear in the signal output of said amplifying means.

8. In apparatus for the reproduction of a magnetic track recorded on an elongated magnetic medium, a reproducing device comprising a relatively thin film of material characterized by the fact that it exhibits the Hall effect, mounting means for said film serving to present one edge of the film to the magnetic track of a magnetic medium moving relative to the device, whereby flux from the track passes directly through the film, electrical terminals connected to two portions of the film spaced apart in a direction extending laterally of the track and adapted to be connected to a source of exciting current, and electrical voltage collecting terminals disposed on opposite sides of the film in a region adjacent said edge and between the first mentioned terminals, said last mentioned terminals having voltage differences developed on the same corresponding to the magnetization of the record track, said last named terminals being adapted for connection with voltage response means.

9. Apparatus as in claim 8 in which the film has a thickness of the order of from two to five microns.

10. Apparatus as in claim 8 in which the film is disposed between magnetic shielding members.

11. In apparatus for the reproduction of a magnetic record track recorded on a magnetic tape medium, a reproducing device comprising magnetic shielding members formed of material of high magnetic permeability, a thin film of material characterized by the fact that it exhibits the Hall effect, said film being disposed between said members with one edge of said film being exposed between adjacent tip ends of said members to provide a surface for positioning in proximity with the tape, with the film extending at right angles to the tape, terminals connected to two portions of the film spaced apart in a direction corresponding to the direction of extent of said exposed edge and adapted to be connected to a source of exciting current, and electrical voltage terminals on opposite sides of the film in a region adjacent said exposed edge and between the first named terminals, said last named terminals having voltage differences developed on the same corresponding to magnetization of the record track, said last named terminals being adapted for connection with voltage response means.

12. Apparatus as in claim 11 in which said terminals are in the form of thin metal films disposed between said magnetic shielding members.

13. Apparatus as in claim 11 in which a plurality of separate sets of said last named terminals are provided, each set being for a separate record track.

14. Apparatus as in claim 3 in which the film is in the form of a strip, the means for applying exciting current to said member including terminals contacting the ends of the film strip and a center terminal contacting a region of the film strip midway between the end terminals, together with exciting circuit means connected to said terminals to cause current flow through the two portions of the film strip extending between the end and center terminals, the polarity on the end terminals being the same, said means for collecting voltages including additional terminals contacting regions on the film that are located between the end and center terminals, and reproducing circuitry connected to said last named additional terminals and responsive to voltages developed upon the same.

References Cited in the file of this patent

UNITED STATES PATENTS 2,702,316 Friend ---------------- Feb. 15, 1955